Reissued July 8, 1930 Re. 17,722

UNITED STATES PATENT OFFICE

EDWIN R. MILLRING, OF NEWARK, NEW JERSEY, ASSIGNOR TO AMERICAN MACHINE & FOUNDRY COMPANY, A CORPORATION OF NEW JERSEY

METHOD OF PROTECTING METAL-COATING BATHS AND COMPOSITION THEREFOR

No Drawing. Original No. 1,674,694, dated June 26, 1928, Serial No. 1,353, filed January 9, 1925. Application for reissue filed March 8, 1930. Serial No. 434,444.

This invention relates to that method of covering metals with a metallic protective coat or envelope, in which the article of metal to be coated is, after being suitably cleansed and fluxed, immersed in a bath of molten coating metal. In the coating of certain articles, such for instance as metal sheets, the sheets after being passed through the bath of coating metal, are passed between metal rolls which act to smooth out the metal coating and wring off the excess of the coating metal, and in order to protect the surface of the coating bath from oxidation, it has been the practice to cover the same with an oil bath which surrounds and submerges the rolls. Palm oil, tallow, rosin, oil and other oils have been used for this purpose, but have not proved satisfactory, because, at the high temperatures required for the application of certain coating metals and alloys, firing of the oil may take place, or the same may rapidly carbonize, polymerize, or oxidize, and lose its virtue in protecting the surface of the coating bath.

As a result of experiments and operations carried out under practical conditions I have discovered a protective liquid which is suitable for protecting the surface of the metal coating bath against oxidization, where coating metals are employed requiring relatively high temperatures for their application, such for instance as lead coatings and coatings of alloys of lead containing 16% or less of tin, which protective liquid possesses properties which will prevent its deterioration, as by firing, carbonizing, polymerizing, or oxidation, under the relatively high temperature conditions required, and which by surrounding the rolls between which the coated sheets are passed, will maintain said rolls at the relatively high temperature necessary for their proper functioning under the conditions mentioned.

In its preferred form, this protective liquid is an oleaginous material, specifically rape seed oil, and may be used alone as a protective covering for the metal bath or it may be used in admixture with another ingredient such as a petroleum product, to form an oil mixture possessing the properties and characteristics above mentioned, and the invention consists of the improved composition of matter consisting of an oil mixture possessing the above described characteristics, and the method of protecting the surface of a molten bath of coating metal.

The protective liquid possessing the above mentioned properties, is preferably an oleaginous liquid, and may consist of rape seed oil which possesses a sufficiently high fire point to prevent firing and also possesses properties which will prevent its deterioration under the working temperature of the coating metal, and this oil will act therefore to protect the surface of the coating bath against oxidation under the temperature conditions described.

In the use of the protective liquid it is placed on the surface of the metal coating bath so as to surround the usual rolls between which the sheets pass after leaving the bath, the liquid by thus surrounding the rolls acting to maintain them at the requisite high degree of temperature necessary for the performance of their functions in smoothing down the coating metal and wringing off the excess thereof.

Instead of rape seed oil alone, I may employ the same in admixture with another ingredient, such as "insulatum A—A," a highly refined petroleum product having a fire point and boiling point in excess of 350° C. and free from tar and from which the unsaturated hydrocarbons have been largely removed, and which has been purified preferably by vacuum distillation, these ingredients to be mixed in the proportions of 98% or thereabout of refined rape seed oil and 2% or thereabout of insulatum. It will be understood that the specific ingredients of this oil mixture may be changed and modified without departing from the limits of the invention, the essential requirement being that the oil mixture will possess the characteristics and properties hereinbefore described. The rape seed oil or the above described oil mixture, according to which may be employed, will, by surrounding the rolls between which the sheets are entered after their passage through the molten coating bath, maintain said rolls at the high degree of temperature necessary for them to perform their functions as described, and in addition will enable the rolls to give a finish to the coated sheets, known as an "oil finish".

While in the foregoing description I have set forth the use of the protective liquid in connection with a molten bath of lead employed to coat metal sheets, it will be understood that the invention is not limited to this particular use, but is applicable as well for the protection against oxidation of the surface of coating baths of other metals; and may be employed in connection with other forms of apparatus, and for the coating of other forms of metal articles. For instance in the coating of wire with a metal coating, the rolls would be omitted and a layer of sand placed on the surface of the bath together with the protective liquid so that in the passage of the wire through the sand layer, the surplus coating metal would be removed and the metal properly distributed in smooth condition on the wire.

A small quantity, say 3 to 5% of palm oil may be added to the oil mixture to assist in the application of tin or metal to the rolls, when it is found desirable to do so.

Having thus described my invention, what I claim is:

1. A composition of matter for protecting the surface of molten metal coating baths against oxidation, which consists of a mixture of rape seed oil and a petroleum product possessing a fire point in excess of 350° C.

2. A composition of matter for protecting the surface of molten metal coating baths against oxidation, which consists of a mixture of rape seed oil and insulatum in proportions substantially as described.

3. A composition of matter for protecting the surface of molten metal coating baths against oxidation, which consists of a mixture of 98% of rape seed oil and 2% of insulatum.

4. The method of protecting the surface of a molten bath of coating metal to be applied to articles to coat the same, and requiring for its application a relatively high temperature, which consists in superposing a protective bath comprising rape seed oil on the surface of the metal bath.

5. The method of protecting the surface of a molten bath of coating metal to be applied to articles to coat the same, and requiring for its application a relatively high temperature, which consists in superposing on the surface of the metal bath, a protective bath consisting of a mixture of rape seed oil and insulatum.

6. The method of protecting the surface of a molten bath of coating metal to be applied to articles to articles to coat the same, and requiring for its application a relatively high temperature, which consists in superposing on the surface of the metal bath, a protective bath consisting of a mixture of 98% of rape seed oil and 2% of insulatum.

In testimony whereof, I have affixed my signature hereto.

EDWIN R. MILLRING.